United States Patent
Denecheau et al.

(10) Patent No.: US 8,014,406 B2
(45) Date of Patent: Sep. 6, 2011

(54) SYSTEM AND METHOD OF INSERTING A NODE INTO A VIRTUAL RING

(75) Inventors: Lionel Denecheau, La Colle sur Loup (FR); Denis Esteve, Vence (FR)

(73) Assignee: International Business Machines Corporation, Armonk, NY (US)

( * ) Notice: Subject to any disclaimer, the term of this patent is extended or adjusted under 35 U.S.C. 154(b) by 759 days.

(21) Appl. No.: 11/850,278

(22) Filed: Sep. 5, 2007

(65) Prior Publication Data

US 2008/0080522 A1 Apr. 3, 2008

(30) Foreign Application Priority Data

Oct. 3, 2006 (EP) .................................... 06301008

(51) Int. Cl.
*H04L 12/56* (2006.01)
*H04L 12/66* (2006.01)

(52) U.S. Cl. ........ 370/400; 370/222; 370/238; 370/352; 370/395.53; 370/412

(58) Field of Classification Search ........... 370/216–503
See application file for complete search history.

(56) References Cited

U.S. PATENT DOCUMENTS

| | | | | |
|---|---|---|---|---|
| 5,297,137 A * | 3/1994 | Ofek et al. | ..................... | 370/403 |
| 5,337,412 A * | 8/1994 | Baker et al. | ..................... | 719/324 |
| 5,490,139 A * | 2/1996 | Baker et al. | ..................... | 370/312 |
| 5,802,056 A * | 9/1998 | Ferguson et al. | ............. | 370/403 |
| 5,822,431 A * | 10/1998 | Sprunk | .......................... | 713/150 |
| 6,105,131 A * | 8/2000 | Carroll | .......................... | 713/155 |
| 6,366,556 B1 * | 4/2002 | Ballintine et al. | ............ | 370/216 |
| 6,563,833 B1 * | 5/2003 | Wool et al. | ..................... | 370/404 |
| 6,621,828 B1 * | 9/2003 | Field et al. | ..................... | 370/466 |
| 6,628,657 B1 * | 9/2003 | Manchester et al. | ....... | 370/395.1 |
| 6,760,327 B1 * | 7/2004 | Manchester et al. | ......... | 370/364 |
| 6,778,529 B1 * | 8/2004 | Field et al. | ..................... | 370/353 |
| 6,822,960 B1 * | 11/2004 | Manchester et al. | ......... | 370/394 |
| 6,920,156 B1 * | 7/2005 | Manchester et al. | ......... | 370/522 |
| 6,928,050 B2 * | 8/2005 | Lynch et al. | .................. | 370/224 |
| 6,944,153 B1 * | 9/2005 | Buckland et al. | ............. | 370/376 |
| 7,006,434 B1 * | 2/2006 | Klein et al. | ................... | 370/223 |
| 7,260,661 B2 * | 8/2007 | Bury et al. | .................... | 710/106 |
| 7,339,887 B2 * | 3/2008 | Griswold et al. | ............. | 370/216 |
| 7,363,359 B1 * | 4/2008 | Tripathy et al. | ............... | 709/223 |
| 7,394,817 B2 * | 7/2008 | Yap | ................................. | 370/400 |
| 7,552,122 B1 * | 6/2009 | Georgiev | ............................ | 1/1 |
| 7,636,358 B1 * | 12/2009 | Manchester et al. | ......... | 370/394 |
| 7,715,330 B2 * | 5/2010 | Denecheau et al. | ......... | 370/255 |
| 7,733,810 B2 * | 6/2010 | Denecheau et al. | ......... | 370/258 |
| 7,796,539 B2 * | 9/2010 | Denecheau et al. | ......... | 370/254 |
| 2004/0081308 A1 * | 4/2004 | Naik et al. | ............... | 379/221.07 |

(Continued)

FOREIGN PATENT DOCUMENTS

EP    1695481 A1 *  8/2006

(Continued)

*Primary Examiner* — Ayaz R Sheikh
*Assistant Examiner* — Venkatesh Haliyur
(74) *Attorney, Agent, or Firm* — George R. McGuire; David B. Woycechowsky; Bond Schoeneck & King, P.L.L.C.

(57) ABSTRACT

There is provided a method and system for inserting a second node into a virtual ring, wherein the virtual ring comprises at least a first node, wherein the first node comprises a virtual ring manager for the virtual ring and wherein the first node is linked with a database.

15 Claims, 5 Drawing Sheets

U.S. PATENT DOCUMENTS

| | | |
|---|---|---|
| 2005/0036482 A1* | 2/2005 | Goroshevsky et al. ....... 370/352 |
| 2006/0039371 A1* | 2/2006 | Castro et al. .................. 370/389 |
| 2007/0081461 A1* | 4/2007 | Denecheau et al. .......... 370/231 |
| 2007/0121658 A1* | 5/2007 | Acharya et al. ............... 370/403 |
| 2007/0268913 A1* | 11/2007 | Denecheau et al. .......... 370/397 |
| 2008/0056281 A1* | 3/2008 | Denecheau et al. .......... 370/400 |
| 2008/0080522 A1* | 4/2008 | Denecheau et al. .......... 370/400 |

FOREIGN PATENT DOCUMENTS

| | | | |
|---|---|---|---|
| EP | 1909436 A1 | * | 4/2008 |
| WO | WO 2005/060156 A1 | * | 6/2005 |
| WO | WO 2005060156 A1 | * | 6/2005 |

* cited by examiner

SYSTEM AND METHOD OF INSERTING A NODE INTO A VIRTUAL RING

FIELD OF THE INVENTION

The invention relates to methods of integrating a node into a virtual ring, to data processing systems for integrating the node into the virtual ring, to computer program products adapted to perform the methods in accordance with the invention, and to a virtual ring manager.

BACKGROUND OF THE INVENTION

In the present description, the term network hereby designates an ordinary network based on the internet protocol (IP) technology. The network can be a local area network (LAN), an intranet of an enterprise or even the (public) internet. The term node designates the computer systems in the network, such as the work stations, servers and routers, etc that are included in the network.

A first user associated with a first node of the network might for example wish to send data packets in a so called multicast to a group of users, wherein each user of the group of users is working on a node of the network. Data packets hereinbelow are also denoted as IP datagrams. If the group of users comprises N users, then the first user must send N−1 messages to the remaining users. The remaining users might wish to answer the multicast message of the first user. In consequence, each node associated with the group of users needs to communicate with the N−1 nodes of the other users. To do this, each node can establish a session with each other node, e.g., by use of a transmission control protocol (TCP) or by use of a user datagram protocol (UDP). The number of sessions can be considerably large in a network which comprises hundreds or thousands of nodes. The sessions can therefore consume a large amount of the available network resources and can have a significant impact in terms of bandwidth consumption in the network. Furthermore, in each node, the establishment of the TCP sessions requires data processing resources and the maintenance of these TCP sessions requires memory in particular to store the context of the TCP sessions (TCP control block).

WO 2005/060156 A1 describes the concept of a virtual ring and is hereby fully incorporated by reference. According to WO 2005/060156 A1, a plurality of nodes of a network can be connected to form the virtual ring within the network. Each node of the virtual ring only communicates with its upstream neighbor node and with its downstream neighbor node. No node of the virtual ring has the complete view of the ring. In a virtual ring, a node only receives messages from its upstream neighbor and sends messages to its downstream neighbor. The total amount of sessions that have to be established between the nodes in order to send a multicast message to all nodes of the virtual ring is therefore drastically reduced in comparison with the concept described before. Thus the bandwidth utilization in the network can be drastically reduced when a virtual ring is used to share messages between a group of nodes.

One of the nodes participating in the virtual ring provides a virtual ring manager. The virtual ring manager manages the topology of the virtual ring and is in particular responsible for the insertion of new nodes into the virtual ring and the removal of nodes from the virtual ring. In principle, any new node can become a member of the virtual ring. Furthermore, the messages exchanged between neighbor nodes of the virtual ring can be easily intercepted and read or manipulated by an unauthorized person.

SUMMARY OF THE INVENTION

There is therefore a need for improved methods, data processing systems and computer program products which ensure that only authorized nodes can become a member of the virtual ring and which allow for a secured communication over the virtual ring.

The present invention is directed to methods, systems and computer programs as defined in the independent claims. Further embodiments of the invention are provided in the appended dependent claims.

In accordance with an embodiment of the invention there is provided a method of inserting a second node into a virtual ring having at least a first node, the first node including a virtual ring manager being adapted to perform the steps of receiving an insertion request message from the second node for the insertion of the second node into the virtual ring, the insertion request message including first authentication information of a first user being associated with the second node, checking the first authentication information against second authentication information being associated with the first user, the second authentication information also stored in a database linked to the first node, if the first authentication information matches the second authentication information, then inserting the second node into the virtual ring, and if the first authentication information differs from the second authentication information, then denying inserting the second node into the virtual ring.

When a second node requests insertion into the virtual ring, the virtual ring manager checks if the first user is authorized to become a member of the virtual ring. The first authentication information is therefore compared with the second authentication information. The second authentication is stored in a credential store or on a radius (Remote Authentication Dial In User Service) server. In case the second information is stored on a radius server, the virtual ring manager can comprise the functionality of a network access server which receives the first authentication information from the second node via a point to point protocol and then sends the first authentication by use of the Radius Protocol to the radius server by which the first authentication information is checked against the second authentication information. Only if the first authentication information matches the second authentication information, is the second node then authorized to join the virtual ring. This provides the advantage that only authorized persons can become members of the virtual ring.

The insertion request message is sent to the virtual ring manager by use of the IP address of the virtual ring manager. The IP address of the virtual ring manager is known to the second node. It can therefore be used to address the virtual ring manager and to send the insertion request message over, for example, a standard TCP/IP connection to the virtual ring manager.

A virtual ring insertion reject message is sent to the second node if the request for insertion of the second node into the virtual ring is denied. Furthermore, if the request for insertion of the second node is accepted, a virtual ring insertion confirm message is sent to the second node. The virtual ring insertion confirm message comprises the IP address of a third node and the IP address of a fourth node. The third node and the fourth node are included in the virtual ring and are neighbor nodes in the virtual ring. The virtual ring insertion confirm message indicates to the second node that the third node has been determined to become the upstream neighbor of the second node and that the fourth node has been determined by the virtual ring manager to become the downstream neighbor of the second node.

When the virtual ring manager receives the insertion request message of the second node, it obtains knowledge about the IP address of the second node. The virtual ring manager stores the IP address of the second node. The virtual ring manager is therefore able to address the second node and to send, e.g., the virtual ring insertion confirm message or the virtual ring insertion reject message. A new node is inserted to the virtual ring so that the node which hosts the virtual ring manager becomes the upstream neighbor of the new node. However, as described above, the new second node can be integrated in accordance with the method in accordance with the invention between any neighbor nodes of the virtual ring.

A first virtual ring change neighbor message is sent by the virtual ring manager to the third node and a second virtual ring change neighbor message is sent by the virtual ring manager to the fourth node. The first and second virtual ring change neighbor messages include the IP address of the second node. The first virtual ring change neighbor message indicates thereby to the third node that the second node is to become its downstream neighbor, and the second virtual ring change neighbor message indicates to the fourth node that the second node is to become its upstream neighbor. Furthermore, the above mentioned virtual ring insertion confirm message is sent in response to the reception of a first virtual ring neighbor changed message from the third node and in response to the reception of a second virtual ring neighbor changed message from the fourth node, wherein the first and second virtual ring neighbor changed messages are sent after reception of the first and second virtual ring change neighbor messages. When, for example, the third node receives the first virtual ring change neighbor message, the third node tears down its TCP session with the fourth node by issuing a "TCP reset" message. The third node stores the IP address of the second node in its so called "Node Ring Record". The third node then establishes a TCP session with the second node and sends the virtual ring neighbor changed message back to the virtual ring manager. The fourth node receives the "TCP reset" message and in response tears down the TCP session with the third node. The fourth node then establishes a TCP session with the second node and sends a virtual ring neighbor changed message back to the virtual ring manager.

An embodiment of the invention, an encryption shared key is provided to the second node by the virtual ring manager during the insertion process of the second node into the virtual ring. The encryption shared key is used by the second node to decipher data comprised in an IP datagram received from the third node and to encrypt data send in an IP datagram to the fourth node. In the virtual ring, the second node only communicates directly with the third and fourth node. The second node only receives messages from its upstream neighbor which is the third node and sends messages to its downstream member which is the fourth node. However, the second node must be able to recognize a datagram circulating along the virtual ring versus a normal IP datagram received from another node outside the virtual ring. To do so, the data sent with an IP datagram is encapsulated inside a TCP datagram comprising an IP header, a TCP header, and a virtual ring header.

The IP header comprises the source IP address of the sending node and the destination IP address of the receiving node. The TCP header comprises source and destination ports which are well known ports for the virtual ring. The virtual ring header comprises a message code, a virtual ring identifier and a sender IP address. The message code indicates that the received message is an IP datagram of the virtual ring having the virtual ring identifier which is used to distinguish two virtual rings from each other (a node can be a member of two virtual rings). The sender IP address relates to the node which has sent the address. When a node sends the IP datagram on the virtual ring, it adds the virtual ring header and encapsulates the data inside a TCP datagram. The datagram is then sent to the downstream neighbor. Each node reads the datagram, processes it and sends it to its downstream neighbor. Each node of the virtual ring gradually receives the IP datagram. When the sender node receives the IP datagram again, the sender node removes the datagram from the ring as it is able to identify on the basis of the sender IP address in the virtual ring header that is has initially sent the IP datagram. The data encapsulated in the IP datagram is encrypted by each node by use of the encryption shared key. The second node is therefore able to decipher the data received from the third node and to further encrypt the data before it is encapsulated again and sent to the fourth node. The use of the encryption shared key provides the advantage that all nodes of the virtual ring share the same encryption key but a node outside the virtual ring is not able to read or even manipulate an IP datagram which has been intercepted by the outside node.

In order to maintain the ring topology, some pieces of information need to be periodically exchanged between the different nodes. One of these pieces of information is called "token" or "token message", referring to the "Token Ring" architecture developed by IBM (IBM is a trademark of International Business Machines Corporation). The token is used as a periodic keep alive message to validate the ring topology. The token is periodically generated by the virtual ring manager and forwarded by each node to its downstream neighbor node. The receipt of the token (from its upstream neighbor node) by the Virtual Ring Manager indicates that the ring topology is valid and the virtual ring is not broken. If the ring is broken for some reason (loss of one node, loss of connectivity between 2 neighbor nodes), the loss of the token will indicate that there is a problem on the ring. Each node monitors the reception of the token. If the token has not been received after a certain amount of time, each node will trigger a so called Ring Recovery process. The token is forwarded from node to node, just like any other piece of information. This means that the token uses the TCP sessions established between the nodes.

The token message comprises an IP header, a TCP header and a virtual ring token. The IP header includes the source IP address of the sending node and destination IP address of the next node in the virtual ring. The TCP header comprises the source and destination ports. The virtual ring token comprises a message code, a virtual ring identifier, and a sequence number. The message code is set to 0x0001 and allows to identify that the type of message is a token message. The virtual ring identifier is used to distinguish the virtual ring form other virtual rings. A node can therefore be a member of several virtual rings. The sequence number is furthermore a numerical value set and incremented by the virtual ring manager. This allows the virtual ring manager to detect a possible duplication of the token.

The encryption shared key provided to the second node during the insertion of the second node into the virtual ring corresponds to the encryption shared key that has been sent via the last token message through the virtual ring. An encryption shared key is therefore provided to the second node which is also known to all other nodes of the virtual ring as it has been provided before by the token message to the nodes. The encryption shared key can then be used for communication between the nodes.

The invention relates to a communication method over the virtual ring. All nodes which are members of the virtual ring had to authorize themselves with the virtual ring manager before they were allowed to enter the virtual ring. Each node uses an encryption shared key for the communication with its neighbor node. The method in accordance with the invention is particularly advantageous as it allows for the distribution of encrypted multicast messages among authorized nodes.

In accordance with another embodiment of the invention there is provided a method of inserting a second node into a virtual ring, the second node being adapted to perform the steps of providing the virtual ring having at least a first node including a virtual ring manager, the first node being linked to a database, sending an insertion request message to the virtual ring manager for requesting the insertion of the second node into the virtual ring, the insertion request message including first authentication information of a first user, the first user being associated with the second node, receiving a virtual ring insertion reject message from the virtual ring manager if the first authentication information of the insertion request message does not match second authentication information of the first user, the second authentication information being stored on the database, the first authentication information being checked against the second authentication information by the virtual ring manager, receiving a virtual ring insertion confirm message from the virtual ring manager if the first authentication information matches the second authentication information, wherein the virtual ring insertion confirm message comprises an IP address of a third node and an IP address of a fourth node, the third node and the fourth node being neighbor nodes in the virtual ring, the third node being determined to become the upstream neighbor of the second node, the fourth node being determined to become the downstream neighbor of the second node, and using the IP addresses of the third and fourth node for establishing sessions with the third and fourth node.

In accordance with yet another embodiment of the invention there is provided a virtual ring manager, comprising a receiving component for receiving an insertion request message for the insertion of a second node into a virtual ring of a first node, the insertion request message comprising first authentication information of a first user, the first user being associated with the second node, means for comparing the first authentication information with a second authentication information associated with the first user, the second authentication information being stored in a database linked to the first node, means for inserting the second node into the virtual ring if the first authentication information matches the second authentication information, and means for denying inserting the second node into the virtual ring if the first authentication information differs from the second authentication information.

BRIEF DESCRIPTION OF THE DRAWINGS

Reference will now be made by way of example to the accompanying drawings in which.

DETAILED DESCRIPTION OF THE INVENTION

Figure 1:
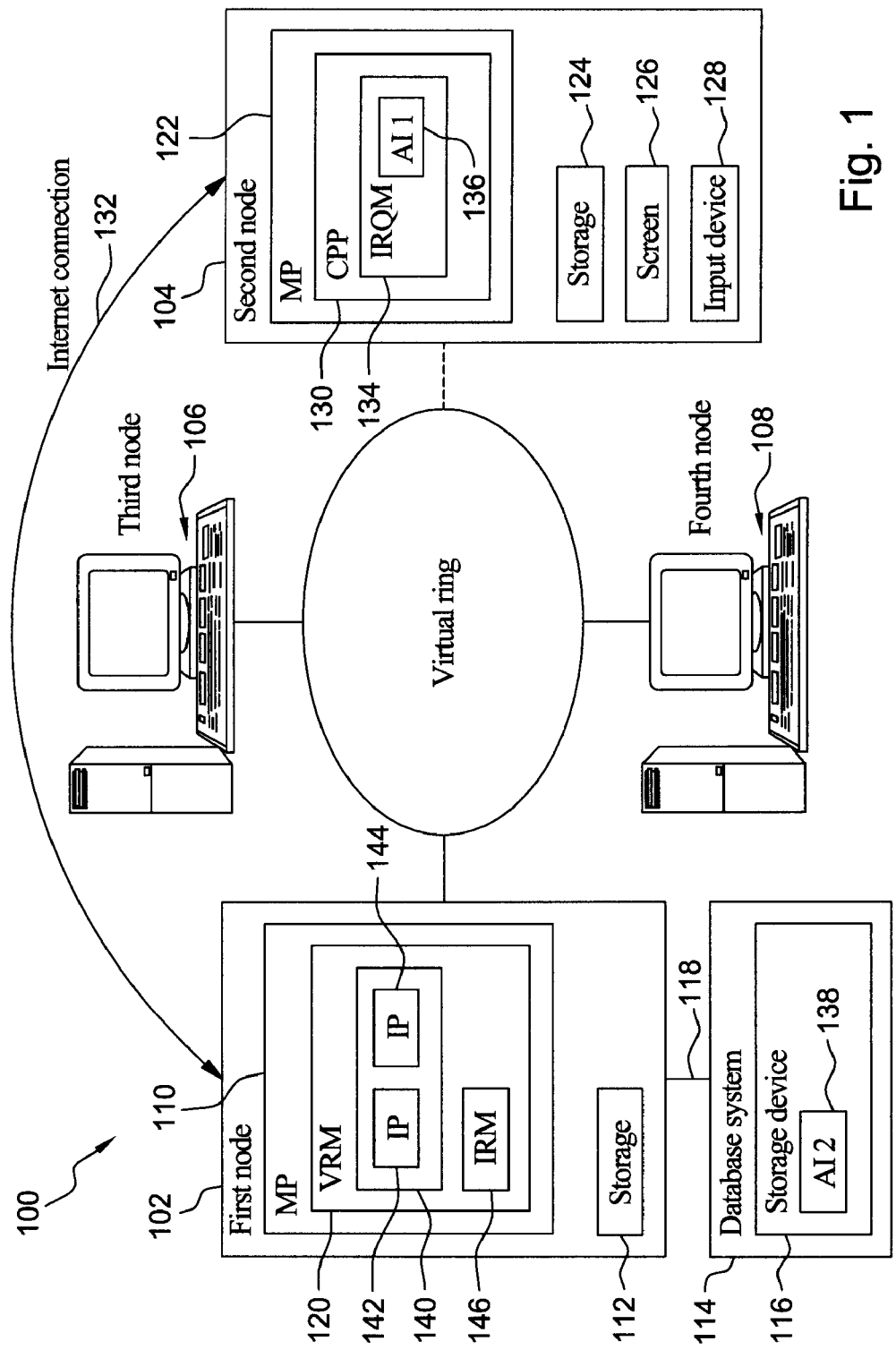
FIG. 1 shows a block diagram of a Virtual ring into which a Second node is to be integrated.

FIG. 1 shows a block diagram of a virtual ring 100 into which a Second node 104 is to be integrated. Virtual ring 100 comprises a First node 102, a Third node 106, and a Fourth node 108. First, Third, and Fourth nodes 102, 106, and 108 are computer systems which are linked with each other over Virtual ring 100. First, Second, Third, and Fourth nodes 102, 104, 106, and 108 can also communicate with each other via standard IP network connections. For example, First and Second nodes 102 and 104 are able to communicate with each other via the connection 132 which is, e.g., a TCP/IP connection over the (public) internet.

First node 102 comprises a microprocessor (MP) 110 and a Storage device 112. First node 102 is further linked via a connection 118 having a Database system 114 which comprises a Storage device 116. Connection 118 is, for example, a secure connection over the internet.

Microprocessor 110 executes a virtual ring manager (VRM) 120 which is a computer program product, permanently stored on Storage device 112 and which has been loaded into microprocessor 110, e.g., when First node 110 has joined Virtual ring 100. The IP address of virtual ring manager 120 is statically configured in each node of virtual ring. It is therefore known to First, Third, and Fourth nodes 102, 106 and 108 as well as to Second node 104 prior to the insertion of the Second node into Virtual ring 100.

Virtual ring manager 120 constitutes a single point of failure. Therefore, a backup virtual ring manager is further employed. The IP address of the backup virtual ring manager is also statically configured in each node. When a node wants to be inserted into the virtual ring and does not receive any response from Virtual ring manager 120, the node will contact the backup virtual ring manager which might be hosted by Third or the Fourth nodes 106 or 108.

Second node 104 comprises a microprocessor (MP) 122, a Storage device 124, a Screen 126, and an Input device 128. Microprocessor 122 executes a computer program product (CPP) 130. Computer program product 130 is permanently stored on Storage device 124 and loaded into microprocessor 122, e.g., when a user working on second node 104 wants the second node to join virtual ring 100.

Computer program product 130 can then send an insertion request message (IRQM) 134 to virtual ring manager 120 over the connection 132. Computer program product 130 is able to send insertion request message 132 because the IP address of virtual ring manager 120 is known to Second node 104. Insertion request message 134 comprises first authentication information (AI 1) 136 of the user.

First authentication information 136 relates for example to a user name of the user for Virtual ring 100 and to a password. Both the username and the password could have been requested from the user before insertion request message 134 was sent. For example, a window could have been popped up on Screen 126 that requested entering of the user's username and password by use of Input device 128.

Virtual ring manager 120 receives insertion request message 134 and extracts first authentication information 136. First authentication information 136 is then compared with a second authentication information (AI 2) 138 stored on Storage device 116. Second authentication information 138 is the authentication information that has been previously assigned to the user.

If first authentication information 136 matches second authentication information 138, then the insertion of Second node 104 into Virtual ring 100 is granted. Otherwise the insertion of Second node 104 into Virtual ring 100 is denied.

If the request for insertion of Second node 104 into Virtual ring 100 is accepted, then a virtual ring change neighbor message is sent to each, Third node 106 and to Fourth node 108. Each virtual ring change neighbor message comprises the IP address of Second node 104. The virtual ring change neighbor message indicates to Third node 106 that Second node 104 is to become its downstream neighbor and to Fourth node 108 that Second node 104 is to become its upstream neighbor. The TCP session established between Third and Fourth nodes 106 and 108 is discontinued and the Third and the Fourth nodes establish TCP sessions with Second node 104. Third node 106 and Fourth node 108 also sent virtual ring neighbor changed messages to the virtual ring manager 120. Furthermore, if the request for insertion of Second node 104 is accepted, a virtual ring insertion confirm message 140 can be sent to the Second node. Virtual ring insertion confirm message 140 comprises an IP address 142 of Third node 106 and an IP address 144 of Fourth node 108. Virtual ring insertion confirm message 140 indicates that Third node 106 shall be the upstream neighbor of Second node 104 and that Fourth node 108 shall be the downstream neighbor of Second node 104.

Second node 104 can receive the virtual ring insertion confirm message 140 and extract the IP addresses 142 and 144 of Third and Fourth nodes 106 and 108. IP addresses 142 and 144 can then be used to establish TCP sessions with the nearest neighbors 106 and 108 over Virtual ring 100. Second node 102 has been successfully integrated into Virtual ring 100.

In contrast, if the request for insertion into Virtual ring 100 is denied by virtual ring manager 120, the virtual ring manager can send a virtual ring insertion reject message (IRM) 146. Second node 102 has not been integrated into Virtual ring 100.

Figure 2:
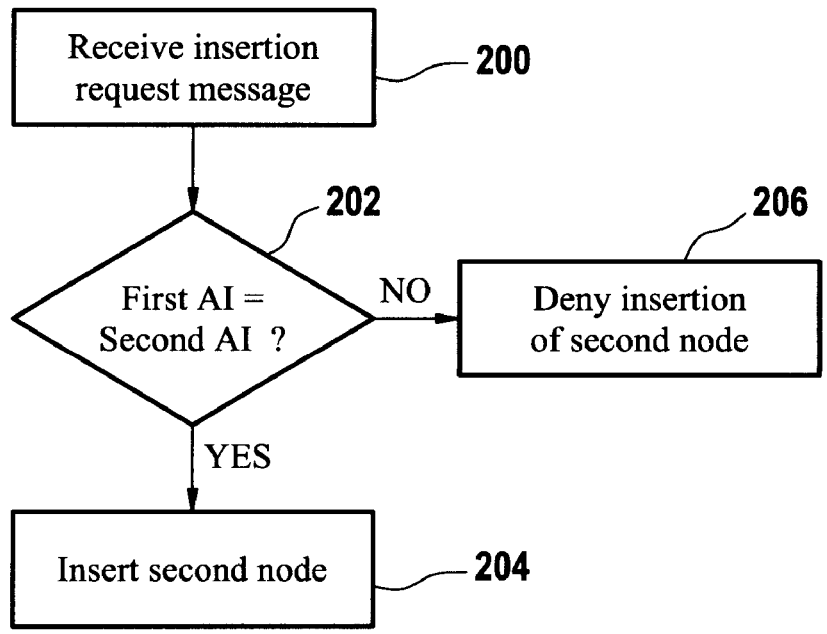
FIG. 2 shows a flow diagram illustrating basic steps performed by a method in accordance with the invention.

FIG. 2 shows a flow diagram illustrating basic steps of a method in accordance with the invention. In step 200 an insertion request message is received from the second node. The second node asks via the insertion request message for the insertion of the second node into the virtual ring. The virtual ring comprises at least a first node and the first node comprises the virtual ring manager for the virtual ring. The first node is further linked with a database, and the insertion request message comprises first authentication information of a first user which is associated with the second node. In step 202 the first authentication information is compared with second authentication information which is stored in the database and which is associated with the first user. If the first authentication information matches the second authentication information, then in step 204 the second node is inserted into the virtual ring. Otherwise, if the first authentication information differs from the second authentication information, then in step 206 the request for insertion is denied by the virtual ring manager.

Figure 3:
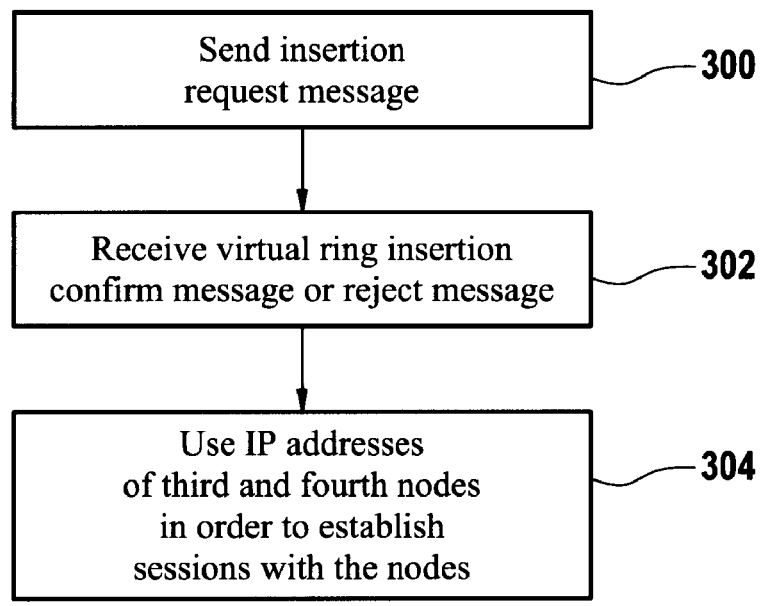
FIG. 3 shows a flow diagram illustrating basic steps performed by a method in accordance with the invention.

FIG. 3 shows a flow diagram of a method of integrating a second node into a virtual ring. The virtual ring comprises at least a first node. The first node comprises a virtual ring manager for the virtual ring and the first node is further linked with a database. In step 300 the second node sends an insertion request message to the virtual ring manager for requesting the insertion of the second node into the virtual ring. The insertion request message comprises first authentication information of a first user which is associated with the second node. In step 302 the second node receives a virtual ring insertion reject message from the virtual ring manager if the first authentication information of the insertion request message does not match second authentication information, wherein the second authentication information is stored in the database, wherein the first authentication information is checked against the second authentication information by the virtual ring manager, and wherein the second authentication information relates to the first user. Alternatively, the second node receives in step 302 the virtual ring insertion confirm message from the virtual ring manager if the first authentication information matches the second authentication information, wherein the virtual ring insertion confirm message comprises the IP address of a third node and the IP address of a fourth node, wherein the third node and the fourth node are neighbor nodes in the virtual ring, wherein the third node is determined to become the upstream neighbor of the second node, and wherein the fourth node is determined to become the downstream neighbor of the second node. In step 304 the second node uses the IP addresses of the third and fourth nodes in order to establish sessions with the third and fourth node, respectively.

Figure 4:
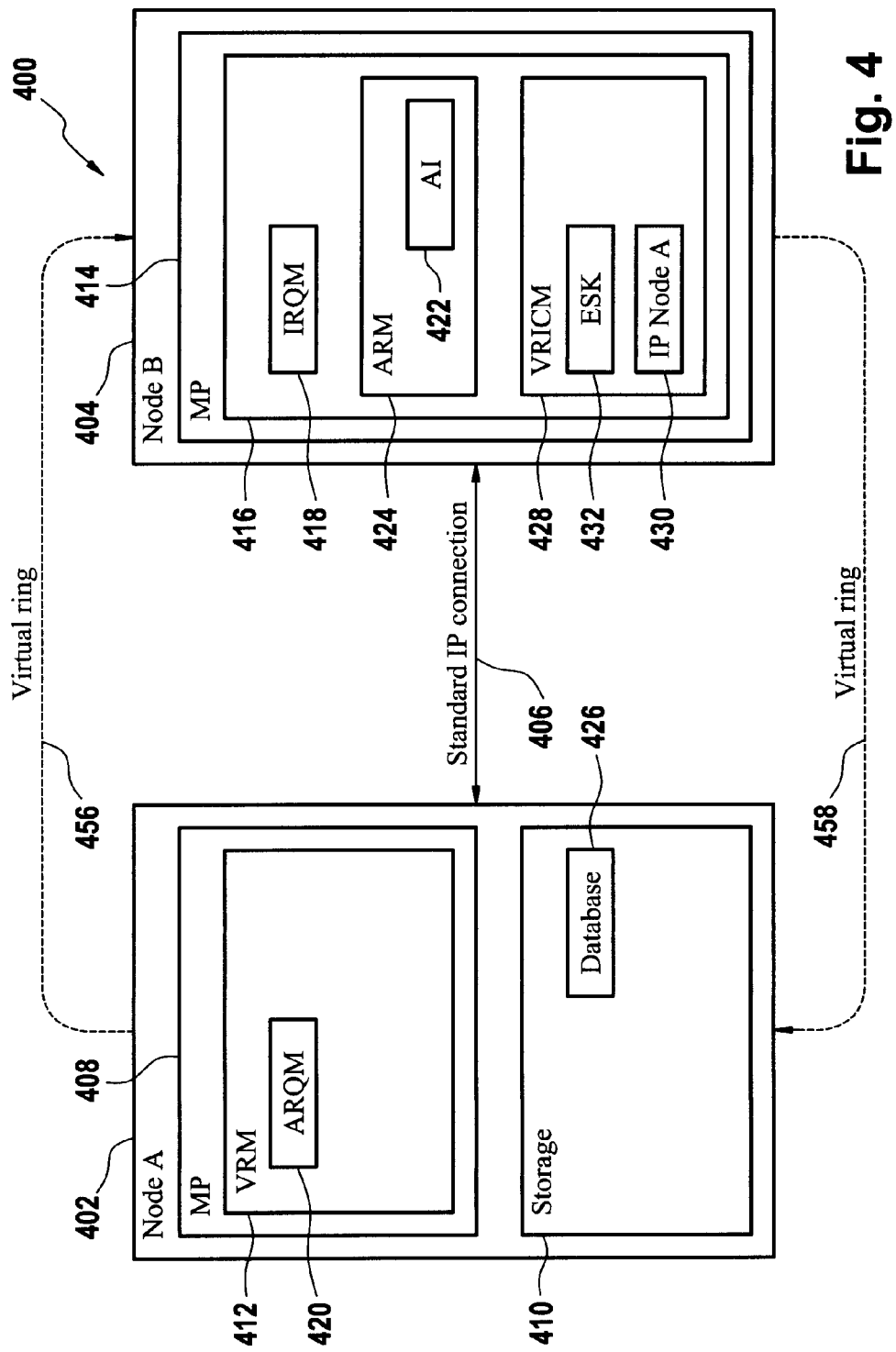
FIG. 4 shows a block diagram of a Node A and Node B which connect with each other to form a Virtual ring.

FIG. 4 shows a block diagram of Node A 402 and Node B 404 which connect with each other to comprise a Virtual ring 400. Node A 402 and Node B 404 are computer systems that are able to communicate with each other over a standard IP connection 406 which might be a connection over the internet.

Node A 402 comprises a microprocessor (MP) 408 and a Storage device 410. Microprocessor 408 executes a virtual ring manager (VRM) 412 which is a computer program product that comprises computer executable instructions which are adapted to manage and to control Virtual ring 400 which is established between Node A 402 and Node B 404. Virtual ring manager 412 is permanently stored on Storage 410 from where it is loaded into Microprocessor 408, for example, when Virtual ring 400 is to be set up.

Node B 404 comprises a microprocessor (MP) 414 which executes a computer program product 416 which is also loaded from a storage device (not shown for simplicity reasons in FIG. 4) when a first user of the Node B 404 wants to establish virtual Ring 400 together with a second user of Node A 402.

Node B 404 sends an Insertion Request Message (IRQM) 418 via connection 406 to the Node A 402. Node A 402 receives Insertion Request Message 418 and responds with an Authentication Request Message (ARQM) 420 through which the first user of Node B 404 is requested to provide first Authentication Information 422. In response to the reception of Authentication Request Message 420, the Node B 404 sends via connection 406 an Authentication Response Message (ARM) 424 comprising first Authentication Information 422 which might correspond to a username and to a password of the first user for Virtual ring 400.

Authentication Response message 424 is received by Node A 402 and first Authentication Information 422 is extracted. Storage 410 comprises a Database 426 which is used as a credential store for storing authentication information of authorized users of Virtual ring 400. Second authentication information relating to the first user is therefore read out from Database 426 and checked against first Authentication Information 422.

If first Authentication Information 422 matches the second authentication information, then a Virtual Ring Insertion Confirm Message (VRICM) 428 is sent from virtual ring manager 412 via connection 406 to Node B 404. Virtual Ring Insertion Confirm message 428 comprises the IP addresses of the uplink and downlink neighbors of Node B 404 which both correspond to an IP address 430 of Node A 402. Node A 402 establishes a downlink TCP session 456 (symbolized by an arrow pointing from Node A to Node B) and an uplink TCP session 458 with Node B 404 (also symbolized by an arrow pointing from Node B to Node A). Downlink TCP session 456 is used to send IP datagrams over Virtual ring 400 from Node A 402 to Node B 404 and uplink TCP session 458 is used to receive IP datagrams over the Virtual ring from Node B 404.

Virtual Ring Insertion Confirm Message 428 further comprises a first Encryption Shared Key (ESK) 432 which shall be used by Node B 404 in order to decipher data encapsulated in TCP datagrams received via Virtual ring 400 from its upstream neighbor which corresponds to Node A 402 and in order to encrypt data to be encapsulated in a TCP datagram which is sent via Virtual ring from the second Node B to its downstream neighbor which also corresponds to Node A.

Figure 5:
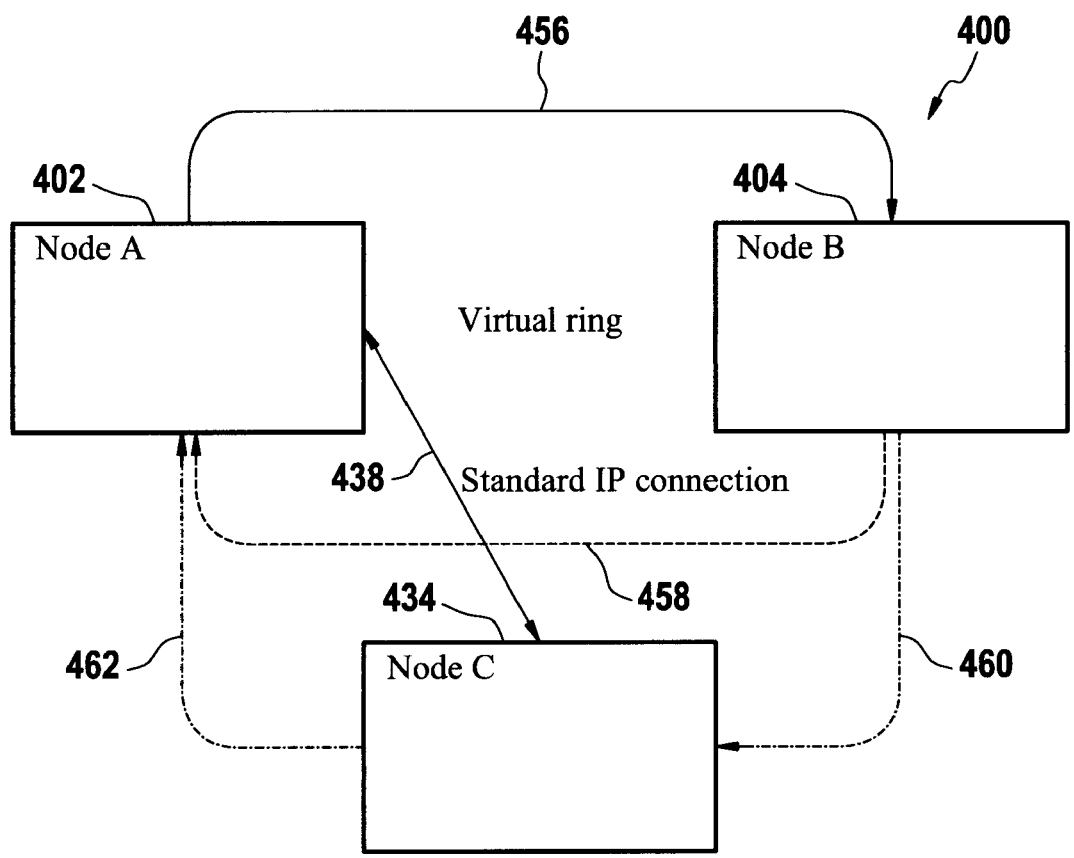
FIG. 5 shows a block diagram of the Nodes A and B connected to form the Virtual ring of FIG. 4 into which Node C is to be integrated.

FIG. 5 shows a block diagram of Node A 402 and Node B 404 connected to form Virtual ring 400 into which Node C 434 is to be inserted into the Virtual ring. Node A 402 and Node B 404 are connected via Virtual ring 400. Node B 404 receives encrypted messages from its upstream neighbor Node A 402 via TCP session 456 and sends encrypted messages by use of the Encryption Shared Key 432 (shown in FIG. 4) to the Node B to its downlink neighbor Node A via TCP session 458. Node C 434 is not yet included in Virtual ring 400. Node C is able to communicate with Node A 402 via a Standard connection 438 which might for example be an IP connection over the internet. Node C 434 requests as described before for Node B 404 access to the Virtual ring 400 from the virtual ring manager hosted by Node A 402 via the connection 438. Node A 402 sends virtual ring change neighbor message comprising the IP address of Node C 434 to nodes of Virtual ring 400 that are determined to become the neighbors of the Node C if the user of the Node C is authorized to access the Virtual ring. Here, Node A 402 is determined to become the downstream neighbor of Node C 434 and the Node B 404 is determined to become the upstream neighbor of Node C. Nodes A and B 402, 404 abort after reception of the virtual ring change messages the TCP session 458 and establish TCP session 460 or correspondingly TCP session 462 with Node C 434.

Furthermore, the virtual ring manager hosted by Node A 402 provides the IP addresses of the nodes that are determined to become the downstream and the upstream neighbor of Node C 434 in the virtual ring insertion confirm message to Node C. Furthermore, an Encryption Shared Key is provided to Node C 434. A virtual ring change message is further sent to Node B 404 which provides the IP address of Node C 434 to Node B and indicates to Node B that Node C shall become the downlink neighbor of Node B.

Node C 434 uses the IP addresses of Node B 404 and Node A 402 in order to establish the downlink/uplink TCP sessions 460, 462 with Node A and Node B, respectively. The messages received over Virtual ring 400 from Node B 404 are deciphered by use of the Encryption Shared Keys and messages that are to be sent to Node A 402 are encrypted by use of the Encrypted Shared Key.

Figure 6:
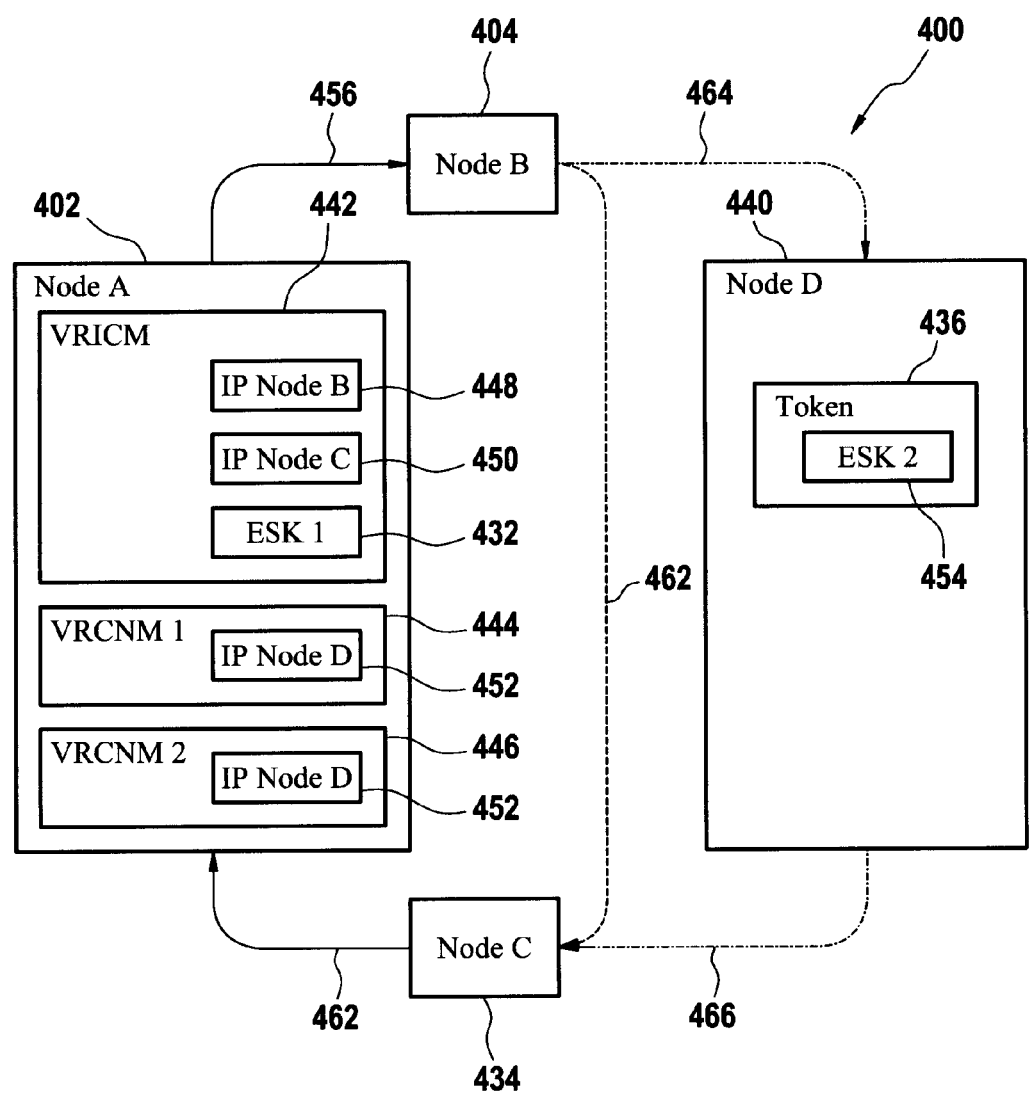
FIG. 6 shows a block diagram of the Virtual ring of FIG. 5 into which Node D is to be integrated.

FIG. 6 shows a block diagram of Virtual ring 400 comprising Node A 402, Node B 404, and Node C 436, and wherein Node D 440 is to be integrated. Node D 440 is able to communicate with Node A 402 over a standard internet connection. Node D 440 requests for Node B 404 and Node C 436 insertion into Virtual ring 400 from the virtual ring manager that is hosted by Node A 402. When the virtual ring manager has determined that Node D 440, or more precisely the user of Node D 440, is authorized to be a member of Virtual ring 400, Node A 402 sends a Virtual Ring Insertion Confirm Message 442 to Node D 440 and virtual ring change neighbor messages to the nodes that shall become the neighbors of Node D 440. Virtual Ring Insertion Confirm Message comprises an IP address 448 of Node B, an IP address 450 of Node C, and the first Encryption Shared Key 432. Virtual Ring Insertion Confirm Message 442 further indicates to Node D 440 that Node B 404 shall become the upstream neighbor of Node D and that Node C 436 shall become the downstream neighbor of Node D. Correspondingly, the virtual ring change neighbor message indicates to Node B 404 that Node D 440 shall become its upstream neighbor and the virtual ring change neighbor message indicates to Node C 436 that Node D shall become its new downstream neighbor. TCP session 462 between Node B 404 and Node C 436 is dropped. Node B 404 establishes a TCP session 464 with Node D 440 and node D establishes a TCP session 466 with Node D. Node D 440 has therefore been successfully integrated into Virtual ring 400.

Node D 440 receives furthermore a Token message 436 from its upstream neighbor Node B on a regular basis. Token message 436 is initially sent by the virtual ring manager hosted by the Node A 402. Token message 436 comprises a second Encryption Shared Key 454. Second encryption shared key 454 replaces first Encryption Shared Key 432 and is further used in order to decipher datagrams received from Node B 404 and in order to encrypt datagrams that are to be sent to Node C 434. In a further token message received from Node B 404, a further Encryption Shared Key can be included which will replace second Encryption Shared Key 454.

REFERENCE NUMERALS

100 Virtual ring
102 First node
104 Second node
106 Third node
108 Fourth node
110 Microprocessor
112 Storage device
114 Database system
116 Storage device
118 Connection
120 Virtual ring manager
122 Microprocessor
124 Storage device
126 Screen
128 Input device
130 Computer program product
132 Internet connection
134 Insertion request message
136 First authentication information
138 Second authentication information
140 Virtual ring insertion confirm message
142 IP address
144 IP address
146 Virtual ring insertion reject message
400 Virtual ring
402 Node A
404 Node B
406 Connection
408 Microprocessor
410 Storage device
412 Virtual ring manager
414 Microprocessor 416 Computer program product
418 Insertion request message
420 Authentication request message
422 First authentication information
424 Authentication response message
426 Database
428 Virtual ring insertion confirm message
430 IP address of node A
432 Encryption shared key
434 Node C
436 Token
438 Connection
440 Node D
442 Virtual ring insertion confirm message
444 Virtual ring change neighbor message
436 Virtual ring change neighbor message
448 IP address of node B
450 IP address of node C
452 IP address of node D
454 Encrypted shared key
456 TCP session
458 TCP session
460 TCP session
462 TCP session
464 TCP session
466 TCP session

What is claimed is:

1. A method of inserting a second node into a pre-existing virtual ring having at least a first node, a third node and a fourth node, with the third and fourth nodes being neighbor nodes in the pre-existing virtual ring and with the first node including a virtual ring manager, the method comprising the steps of:
inputting, by a first user, first authentication information for the first user at the second node;
sending over the public internet directly from the second node to the first node and insertion request message;
receiving over the public internet the insertion request message by the first node directly from the second node, with the insertion request message requesting the insertion of the second node into the virtual ring, and with the insertion request message including the first authentication information;
checking, by the first node, the first authentication information against second authentication information also associated with the first user, the second authentication information being stored in a database linked to the first node; and
if the first authentication information matches the second authentication information, then revising the virtual ring to insert the second node into the virtual ring so that the third node is the downstream neighbor of the second node in the virtual ring and the fourth node is the upstream neighbor of the second node in the virtual ring.

2. The method of claim 1, further comprising:
sending, over the public internet, a first virtual ring change neighbor message to the third node and a second virtual ring change neighbor message to the fourth node, the first and second virtual ring change neighbor messages comprising the IP address of the second node, the first virtual ring change neighbor message indicating to the third node that the second node is to become its downstream neighbor, the second virtual ring change neighbor message indicating to the fourth node that the second node is to become its upstream neighbor;
sending, over the public internet, the virtual ring insertion confirm message in response to the reception of a first virtual ring neighbor changed message from the third node and in response to the reception of a second virtual ring neighbor changed message from the fourth node, the first and second virtual ring neighbor changed messages being sent after reception of the first and second virtual ring change neighbor messages.

3. The method of claim 1, wherein a virtual ring insertion reject message is sent, over the public internet, to the second node if the request for insertion of the second node into the virtual ring is denied, and wherein a virtual ring insertion confirm message is sent, over the public internet, if the request for insertion of the second node is accepted, wherein the virtual ring insertion confirm message comprises the IP address of a third node and the IP address of a fourth node, the third node and the fourth node being included in the virtual ring and being neighbor nodes in the virtual ring, the third node being determined to become the upstream neighbor of the second node, the fourth node being determined to become the downstream neighbor of the second node.

4. The method of claim 3, further comprising:
sending, over the public internet, a first virtual ring change neighbor message to the third node and a second virtual ring change neighbor message to the fourth node, the first and second virtual ring change neighbor messages comprising the IP address of the second node, the first virtual ring change neighbor message indicating to the third node that the second node is to become its downstream neighbor, the second virtual ring change neighbor message indicating to the fourth node that the second node is to become its upstream neighbor;
sending, over the public internet, the virtual ring insertion confirm message in response to the reception of a first virtual ring neighbor changed message from the third node and in response to the reception of a second virtual ring neighbor changed message from the fourth node, the first and second virtual ring neighbor changed messages being sent after reception of the first and second virtual ring change neighbor messages.

5. The method of claim 4, further comprising providing during insertion of the second node an encryption shared key to the second node, the encryption shared key being used to decipher data comprised in an IP datagram received from the third node and to encrypt data to be sent in an IP datagram to the fourth node.

6. The method of claim 5, wherein the virtual ring manager I periodically sends, over the public internet a token message through the virtual ring, wherein each token message comprises an encryption shared key which differs from the encryption shared key comprised in the foregoing token message, wherein the encryption shared key is ciphered by use of the encryption shared key of the foregoing token message.

7. The method of claim 6, wherein the encryption shared key provided to the second node during the insertion of the second node into the virtual ring corresponds to the encryption shared key sent via a last token message through the virtual ring.

8. A data processing system comprising means to carry out the steps of the method according to claim 1.

9. A computer program product comprising computer executable instructions encoded in a non transitory computer readable medium, said instructions when executed on a computer to perform the method in accordance with claim 1.

10. A method of inserting a second node into a virtual ring, the second node to perform the steps of:
providing the virtual ring having at least a first node including a virtual ring manager, the first node being linked to a database;

sending an insertion request message to the virtual ring manager for requesting the insertion of the second node into the virtual ring, the insertion request message including first authentication information of a first user, the first user being associated with the second node;

receiving a virtual ring insertion reject message from the virtual ring manager if the first authentication information of the insertion request message does not match second authentication information of the first user, the second authentication information being stored on the database, the first authentication information being checked against the second authentication information by the virtual ring manager;

receiving a virtual ring insertion confirm message from the virtual ring manager if the first authentication information matches the second authentication information, wherein the virtual ring insertion confirm message comprises an IP address of a third node and an IP address of a fourth node, the third node and the fourth node being neighbor nodes in the virtual ring, the third node being determined to become the upstream neighbor of the second node, the fourth node being determined to become the downstream neighbor of the second node; and using the IP addresses of the third and fourth nodes for establishing sessions with the third and fourth nodes;

wherein the virtual ring comprises a plurality of nodes, the plurality of nodes including the first node, with the plurality of nodes being logically connected for data communication in the form of a ring so that each node will only engage in a data communication through the virtual ring by: (i) receiving data from a single upstream neighbor node from the plurality of nodes; and (ii) sending data to a single downstream neighbor node from the plurality of nodes.

11. The method of claim 10, wherein the virtual ring insertion confirm message further comprises a first encryption shared key, wherein the first encryption shared key is used to encrypt datagrams to be sent to the fourth node, and wherein the first encryption shared key is used to decipher datagrams received from the third node.

12. The method of claim 11, further comprising:

receiving a token message from the third node, the token message comprising a second encryption shared key;

using the second encryption shared key for the encryption of datagrams to be sent to the fourth node and for the decryption of datagrams received from the third node until a further token message comprising a third encryption shared key is received, the third encryption shared key replacing the second encryption shared key.

13. A data processing system comprising means to carry out the steps of the method according to claim 10.

14. A computer program product comprising computer executable instructions encoded in a non transitory computer readable medium, said instructions to perform the method in accordance with claim 10.

15. A virtual ring manager located at a first node of a virtual ring, the manager comprising:

a receiving component for receiving, over the public internet an insertion request message for the insertion of a second node into a pre-existing virtual ring including at least the first node, a third node and a fourth node, the insertion request message comprising first authentication information of a first user, the first user being associated with the second node;

means for comparing the first authentication information with a second authentication information associated with the first user, the second authentication information being stored in a database linked to the first node;

means for inserting the second node into the virtual ring, so that the third node is the downstream neighbor of the second node in the virtual ring and the fourth node is the upstream neighbor of the second node in the virtual ring, if the first authentication information matches the second authentication information; and means for denying inserting the second node into the virtual ring if the first authentication information differs from the second authentication information.

* * * * *